United States Patent Office 3,250,733
Patented May 10, 1966

3,250,733
PROCESS FOR VULCANIZING MIXTURES OF RUBBERS AND PRODUCT THEREOF
Arnold A. Giller, Wiesbaden, Germany, assignor to Chemische Werke Albert, Wiesbaden-Biebrich, Germany, a corporation of Germany
No Drawing. Filed Nov. 24, 1961, Ser. No. 154,826
Claims priority, application Germany, Nov. 29, 1960, C 22,852
The portion of the term of the patent subsequent to June 15, 1982, has been disclaimed
15 Claims. (Cl. 260—5)

This application is a continuation-in-part of my copending applications Serial No. 834,397, filed August 18, 1959, now Patent No. 3,056,754, and Serial No. 37,111, filed June 20, 1960, now Patent No. 3,189,567.

This invention is concerned with improvements in or relating to the vulcanization of mixtures of butyl rubber with other elastomers.

In the specification and examples all parts and percentages are by weight unless otherwise stated. The term "butyl rubber" is generally used to denote synthetic copolymers of an isoolefin, such as ethylmethylethylene, or more usually, isobutylene, with a minor proportion of a poly-unsaturated olefinic compound having from 4 to 14 carbon atoms per molecule. The isoolefins used generally have from 4 to 7 carbon atoms. The poly-unsaturated olefinic compound is usually an aliphatic conjugated diolefin having from 4 to 6 carbon atoms, and is preferably isoprene or butadiene. The butyl rubber contains only relatively small amounts of the diene component, generally from about 0.5 to 5%, more often from about 1 to 3%, and seldom more than 10% by weight calculated on the total weight of the elastomer. In commercial types of butyl rubber the unsaturation is generally between about 0.6 and 2.5 mol percent. The term "mol percent unsaturation" defines the number of diolefin units, e.g., isoprene units, per 100 monomer units in the polymer chain. According to this definition natural rubber has a 100 mol percent unsaturation.

Vulcanization is a process for improving the mechanical properties of an elastomer of natural or synthetic origin or a mixture of such elastomers in which the elastomer or elastomers is treated, generally by heating therewith, with a chemical substance (a vulcanizing agent), to promote cross-linking and/or bridge formation between the molecules of the elastomer(s). Mixtures of elastomers which may be vulcanized are referred to as vulcanizable mixtures and the products of vulcanization as vulcanizates.

Butyl rubber may be mixed with other components usually present in vulcanizable mixtures, and may also be processed in the same manner as natural rubber or other synthetic elastomers such as copolymers of butadiene with styrene or acrylonitrile. In order to vulcanize butyl rubber, however, it is necessary to employ a strong vulcanizing agent and to effect vulcanization at relatively high temperatures. Due to their particular properties, notably their low permeability to gas and high thermostability, vulcanizates of butyl rubber are used, for example, in the manufacture of inner tubes, curing bags for new tyres and for retreading tyres.

The use of butyl rubber has been limited by the fact that homogeneous mixtures of butyl rubber and elastomers vulcanizable in the presence of sulfur, for example mixtures of butyl rubber with natural rubber or copolymers of butadiene with styrene or acrylonitrile, cannot, in general, be vulcanized to yield useful vulcanization products. The reason for this unsatisfactory behavior is generally believed to lie in the very different behavior during vulcanization of butyl rubber on the one hand and other elastomers vulcanizable in the presence of sulfur on the other hand. It appears that the butyl rubber ingredient of such mixtures is not, or only to an insufficient degree, cross-linked, since the vulcanizing agents are consumed too rapidly or to too great an extent by the other, more unsaturated, elastomers. Vulcanization products obtained by vulcanizing mixtures of butyl rubber with various elastomers in the usual manner tend to be heterogeneous and to delaminate which defects render them unsuitable for most purposes. In order to vulcanize butyl rubber together with elastomers vulcanizable in the presence of sulfur to yield homogeneous vulcanizates, it has generally been considered necessary to incorporate inner layers of a mixture of brominated butyl rubber and a butadiene-styrene copolymer, which are firmly linked during vulcanization with mixtures based on butadiene-styrene copolymer as well as with mixtures based on butyl rubber. Brominated butyl rubber may be vulcanized far more easily and at a lower temperature than butyl rubber itself. By compounding it with certain amounts of other elastomers mixtures may be obtained in which the brominated butyl rubber is linked as well with butyl rubber as with, e.g., a butadiene-styrene rubber.

I have now found that homogeneous vulcanizates may be obtained from mixtures of butyl rubber and other rubbery elastomers if the vulcanization is carried out in the presence of certain metal halides specified below as well as in the presence of a vulcanizing agent. The vulcanizates produced according to the invention are homogeneous and show little or no tendency to delaminate even on soaking for prolonged periods in organic solvents.

According to the invention, therefore, there is provided a process for the vulcanization of mixtures of butyl rubber and one or more other elastomers, natural or synthetic, vulcanizable in the presence of sulfur in which the vulcanization is carried out in the presence of from 0.1 to 10%, based on the weight of the mixture of elastomers, of a halide of a metal of group IIa, IIb, IIIa or IIIb of the periodic table or a halide of a heavy metal or a mixture of precursors therefor and in the presence of a vulcanizing agent.

Suitable vulcanizing agents for use in the process according to the invention include sulfur in the presence of a vulcanization accelerator or, preferably, a phenol resin as hereinafter defined.

By the term "phenol resin" as used herein I mean a resin obtained from the alkaline condensation of an aldehyde, e.g., formaldehyde, with a mono- or polyhydric phenol, preferably a substituted phenol.

The metal halide is preferably present in an amount of from 0.3 to 8%, advantageously 1 to 4%, based on the weight of the mixture of elastomers.

It has been found convenient to heat the mixture of elastomers, containing the metal halide or the compounds giving rise thereto as specificed below, to a temperature of from 70 to 250° C., preferably from 120° to 220° C., advantageously to 160° to 210° C., for a short time, i.e., up to 20 minutes, prior to vulcanising the mixture.

Examples of other elastomers which may be used in the mixtures to be vulcanized are copolymers of butadiene and/or isoprene with acrylonitrile or styrene of varied types and compositions and homopolymers of choroprene, butadiene or isoprene, or natural rubber itself. In the isoprene polymers the isoprene unit may be in either the 1,4-cis- or 1,4-trans-position. The butyl rubber may be present in the elastomer mixtures in any desired amount, e.g., between 0.1 and 99.9%, preferably between 5 and 95% and advantageously between 20 and 80%.

As metal halides it is preferred to use the chlorides, especially zinc chloride, iron chloride or stannous chloride. However, the chlorides of the other metals listed below may also be used with good results. The effect of the metal halides may be increased by the addition of fillers, particularly active or semiactive carbon black to the vulcanization mixture. The metal halides may be incorporated into the elastomer mixtures per se. It is, however, often difficult to incorporate the metal halides directly into the elastomer mixture, mixing and processing procedures being rendered more difficult and sometimes considerable corrosion of the containing vessel occurs. It is, therefore, desirable to produce the metal halides in situ, i.e., in the elastomer mixture, preferably during the mixing procedure, by reaction of a halogen-donor and a suitable metal compound which react with each other at the vulcanization temperatures. The term "halogen-donor" is used to denote organic compounds from which halogen or hydrogen halide may be split off. Suitable metal compounds are, for example, the oxides and salts of weak, inorganic or organic, acids, for example, metal carbonates.

Suitable halogen-donors are these compounds from which halogen or halogen halide is split off under the conditions of vulacnization, e.g., at a temperature above 70° C. and in the presence of one of the metal compounds. Halogen-donors include, for example, polymers or copolymers of vinylchloride and/or vinylidene chloride with other polymerizable compounds, preferably those which contain no stabilizing agent; halogen containing elastomers, for example polychloroprene; halogenated butyl rubber, for example chlorinated or brominated butyl rubber; halogenation or chlorosulfonation products of high-density or low-density polyethylene or higher polyolefins; colloidal mixtures of polyvinyl chloride with an arcryonitrile-butadiene copolymer; halogenated hydrocarbons containing halogen atoms which may be split off or which may split off hydrogen halide, for example liquid or solid chlorination products of paraffinic hydrocarbons of natural or synthetic origin; halogenated factice; benzyl-, benzal- or benzotrichloride or homologues thereof, heptachlorocyclohexane; acid halides, for example lauroyl, oleyl, stearyl or benzoyl chlorides; and compounds which contain the group >NHal, for example, N-bromosuccinimide or N-bromo-phthalimide. Bromo-compounds have been found to be particularly effective. Mixtures of different halogen-donors may also be used.

Suitable metal compounds for use with the halogen-donors include for example, oxides or salts of magnesium, mercury, calcium, beryllium, tin, lead, manganese, cobalt, nickel, antimony and especially zinc, aluminum and/or iron. The metals may be used in the form of the oxide or, for example, of salts of weak acids such as formic, acetic, lauric, stearic, benzoic, chromic and carbonic acids. The basic salts of the acids may also be used. Furthermore mixtures of several of these compounds may be used. Especially good results have been obtained by using zinc oxide alone or together with an iron salt of one of the above acids, e.g., stearic acid.

The amount of halogen-donor and metal compound used in the mixture depends on their halogen and metal content respectively and on the ease with which the halogen or hydrogen halide is split off. The amount of these compounds used also depends on the desired degree and conditions of vulcanization. Generally they are used in an amount which leads to the formation of 0.1 to 10, preferably 0.3 to 8.0 parts of metal halide per 100 parts of elastomer. However, smaller or larger amounts of halogen-donor and metal compound may be added, depending on the particular requirements of any vulcanization. The ratio of metal compound to halogen-donor may be varied within wide limits, and the amount of metal or halogen-donor may exceed that of the other component. For example the metal compound may be added in such an amount that the amount of halogen or hydrogen halide formed by the halogen-donor is only sufficient to form a basic metal halide. The favourable ratio of metal compound to halogen-donor may readily be determined by experiment. For example 3 parts of chlorosulfonated polyethylene with 0.9 to 1.4 parts of zinc oxide or with 5 parts of zinc stearate per 100 parts of the elastomer has been found to give excellent results.

The metal halide or the compounds forming it may be added to the mixture of butyl rubber with the other elastomers before or whilst rolling the mixture between heating rolls, generally at a temperature of above 70° C. If the rubber mixture is compounded on roll mills compounding is generally carried out for a period up to 15 minutes for economic reasons. The metal halide may, however, also be added or the metal compound be reacted with the halogen-donor while storing or tempering the mixture at a temperature above 70° C. In the case of storing or tempering there is, of course, no time limitation and accordingly the mixture may be heated for a longer period, e.g., from 30 to 90 minutes, during which the metal halide is formed by reaction between metal compound and halogen-donor. The heat treatment, however, not only leads to the formation of the metal halide with its consequent effect on the elastomers, but also acts on the rubber ingredients, increases the vulcanization rate and improves the vulcanization effect. The reaction of the halogen-donor and the metal compound may also be carried out by mixing some or all of the ingredients of the mixture to be vulcanized (except, of course, the sulfur or resin), for example in an internal mixer such as a Banbury mixer, at a temperature above 70° C. In this procedure it is not necessary to conduct the whole mixing procedure at a temperature above 70° C., it being sufficient to keep the mixture at that temperature only for a period sufficient to allow reaction between the metal compound and the halogen-donor.

The formation of the metal halide may also be started at the normal compounding temperature and finished during vulcanization. The various ingredients may also be mixed in an internal mixer and then kneaded for a few minutes. The most favourable conditions for reaction between the halogen-donor and the metal compound may be readily determined for each case by simple experiment. By appropriate selection of the metal compound and the halogen-donor and the compounding temperature, the amount of metal halide formed in situ in the elastomer may be varied within wide limits. The amount of the metal halide used and the conditions of the heat-treatment are preferably adjusted to each other. For example in the presence of a relatively large amount of metal chloride, e.g., from 2.0 to 4.0 parts zinc chloride or stannous chloride ($SnCl_2.2H_2O$), a relatively short heat treatment of, e.g., about 5 minutes at 160° to 180° C. is sufficient. Similar results may be obtained, if only 1.0 part of zinc chloride is produced in situ in the mixture and this is then heated for 10 minutes to about 190° to 210° C.

It is also possible to carry out the heat-treatment in the presence of a small amount, e.g., 0.1 to 1.5% of the phenol resin acting as a vulcanizing agent. In this case some cross-linking occurs during the heat-treatment which, however, only slightly affects mixing.

Vulcanization may be effected by any convenient procedure, for example by heating in hot air or steam or by pressing in heated moulds. Sulfur together with the known vulcanization accelerators, substituted alkyl phenol resins or resins obtainable by a reaction of formaldehyde with diphenols, such as p,p'-dihydroxydiphenylpropane, are especially suitable vulcanizing agents.

The vulcanization is generally effected at a temperature between 110° and 220° C., preferably at a temperature between 135° and 180° C. Of course, the vulcanization takes more time at lower temperatures than at higher temperatures. In order to avoid scorching by premature vulcanization it is generally necessary to incorporate the sulfur or the resin into the mixture, which may be hot or cold, at a late stage of the compounding procedure. The other components of the mixture to be vulcanized may be mixed with each other in any desired order. It is, however, also possible to prepare a complex compound of the alkyl resin and the metal halide, for example from the above-mentioned resins and metal halides, and to use these complex compounds as vulcanizing agents, as described in application Serial No. 834,397, now Patent No. 3,056,754.

If the metal halide is to be produced in situ in the mixture, it is preferred to incorporate the halogen-donor and the metal compound in the elastomer first, in order to provide a good distribution of metal compound and halogen-donor in the elastomer to ensure that the greatest possible amount of metal halide is formed. The other ingredients, e.g., stearic acid, palmitic acid, myristic or lauric acid, carbon black, silicon dioxide or any other additional substances or fillers may then be added.

Polymers such as polyethylene, polypropylene, copolymers of ethylene or propylene or similar olefins or mixtures of several such polymers may also be added to the mixtures to be vulcanized.

Suitable resins for use as vulcanizing agents in the process of the invention may, as previously stated, be prepared by condensing a bi-nuclear diphenol with formaldehyde, in an alkaline medium and simultaneous or subsequent etherification of the initially formed polymethylol compounds. Suitable diphenols are dihydroxy diphenyl, dihydroxy dibenzyl, dihydroxy diphenyl-methane, or homologues thereof, e.g., dihydroxy diphenyl-methyl-methane, -dimethyl-methane, -ethyl-methane, -methylethyl-methane, -diethyl-methane, -methylpropyl-methane, -dipropyl-methane, -methyl hexyl-methane, -dihexylmethane, -methylcyclohexyl-methane, or products substituted in the phenyl nuclei such as the 3-methyl, 3,5-dimethy or 3,3'-diisopropyl substitution products. Diphenols containing the two hydroxy groups in the p,p'-positions are especially preferred. The methylol groups of the polymethylol compounds, generally obtained by reaction of at least 2 and preferably about 4 mols of formaldehyde with the diphenol, are preferably partially etherified with monohydric alcohols such as methyl, ethyl, propyl, isopropyl, butyl, octyl, isooctyl, dodecyl or benzyl alcohols, to such an extent that they are still soluble in organic solvents. Preferably on average at least one, conveniently about three, methylol groups are etherified. These partially etherified resins may be further modified, i.e., plasticised, by heating to a temperature above 70° C. with a hydroxy fatty acid containing more than 10 carbon atoms or a glyceride thereof. The resin produced is still soluble in organic solvents. The resins may also be plasticised under the same conditions as mentioned above with fatty oils, neutral reacting resins such as urea resins or polyester resins comprising polyesters of dicarboxylic acids and polyhydric alcohols, or esters of polyhydric alcohols with a mixture of (A) dicarboxylic acids and (B) fatty or resin acids or mixtures of fatty and resin acids. The production of such plasticised resins is described, for example, in German Patents Nos. 605,917 and 684,224.

Suitable phenol resins may also be prepared, for example, from monohydric phenols in which two of the three positions, ortho-, ortho- and para- to the phenolic hydroxy group, preferable the two ortho-positions, are free for substitution on reaction with an aldehyde. Aldehydes having 1 to 7 carbon atoms may be used for this reaction, for example formaldehyde, acetaldehyde, propionaldehyde, butyraldehyde, crotonaldehyde, benzaldehyde or furfural or mixtures thereof. The aldehydes are preferably employed in an amount of at least 1.2 mols of aldehyde for every mol of phenol. Crude phenols or mixtures of different phenols may be employed in place of pure phenols. It is also possible to use mixtures of phenols comprising a major proportion of the above-mentioned type of phenols and a minor proportion, preferably less than 20 mol percent, of one or more phenols in which one or three of the ortho-, ortho-, and para-positions are free for substitution on reaction with an aldehyde.

The phenols from which the phenol resins are prepared may be substituted in any one of the ortho-, ortho- or para-positions to the phenolic hydroxy group and/or in one or both of the positions meta- to the phenolic hydroxy groups. The substituents may be the same or different. Preferably they are hydrocarbon radicals having from 1 to 12 carbon atoms, for example methyl, ethyl, propyl, iso-propyl, butyl, secondary butyl, iso-butyl, tertiary butyl, straight-chained, branched or cyclic primary, secondary or tertiary pentyl, hexyl, heptyl, octyl, decyl or dodecyl radicals. Preferred hydrocarbon radicals are tertiary amyl, normal or isooctyl, such as ethylhexyl or diisobutyl, cyclohexyl, methylcyclohexyl, benzyl or phenyl radicals. Preferably the substituents together contain from 1 to 12 carbon atoms and the substituent in the p-position 4 to 10 carbon atoms. These substituents, and the phenol nuclei, may also contain chlorine or bromine substituents. If both meta-positions are substituted and the substituents together contain at least five carbon atoms, on reaction with formaldehyde the para-position of the phenol cannot be substituted because of steric hindrance, i.e., phenols of this type behave in the same manner as phenols substituted in para-position.

The phenol resins used as vulcanizing agents in the process according to the invention are generally semi-solids, and may conveniently be used in conjunction with varying amounts of low boiling solvents such as butanol, benzene, toluene or xylene in the form of viscous liquids. It is more convenient, however, to use the resins in the form of solutions in high-boiling liquid compounds. Such compounds may, for example, be compounds which may be per se used as plasticisers for rubber compositions, for example mineral oils, aliphatic or aromatic polyethers, esters of polybasic carboxylic acids, polyglycols, polyhydric alcohols or mixtures thereof. The high-boiling compounds may be monomeric or polymeric in nature. The low-boiling solvents may be replaced by the high-boiling compunds by mixing mixtures of the resins and low-boiling solvents with a suitable amount, e.g., 10 to 50 percent, of a higher-boiling compound and distilling off the lower-boiling solvents in vacuo, preferably at a temperature below 100° C. The alkyl phenol resins are preferably used in an amount of 1 to 20 parts of resin to 100 parts of elastomer; larger or smaller amounts of resin may, however, be used.

If the vulcanization is effected using sulfur as vulcanizing agent, known vulcanization accelerators may be used. Such vulcanization accelerators include mercaptobenzothiazole, dibenzothiazyldisulfide, tetramethylthiuramdisulfide, tetraethylthiuramdisulfide, tetramethylthiurammonosulfide, di-pentamethylenethiuramtetrasulfide, tellurium diethyldithiocarbamate, zinc dimethyldithiocarbamate, quinone dioxime-bis-benzoate, quinone dioxime, diphenylguanidine, di-ortho-tolylguanidine, orthotolylbiguanidine and N-cyclohexyl-2-benzothiazyl-sulphenamide.

Vulcanizates obtained by the process according to the invention have good properties and retain their good properties even when exposed to high temperatures for long periods of time, i.e., they have good thermal stability. They may be used, for example, in the production of curing bags for new tyres or for re-treading tyres, inner tubes, hoses, floor coverings, washers and shock absorbers.

In order that the invention may be well understood the following examples are given by way of illustration only:

*Example 1*

This example describes the manufacture of homogeneous vulcanization products by vulcanizing a mixture of butyl rubber and a butadiene-styrene copolymer using an alkyl phenol resin as vulcanizing agent. The butyl rubber used had a high Mooney viscosity.

TABLE 1

| Mixture | I | II | III |
|---|---|---|---|
| | Parts | Parts | Parts |
| Butadiene-styrene copolymer [1] | 65.0 | 48.75 | 32.5 |
| Butyl rubber [2] | 32.5 | 48.75 | 65.0 |
| Chlorosulfonated polyethylene (29% Cl, 1.25% S) | 2.5 | 2.5 | 2.5 |
| Zinc oxide | 1.4 | 1.3 | 1.1 |
| Stearic acid | 1.0 | 1.0 | 1.0 |
| Furnace carbonblack (high abrasion strength) | 50.0 | 50.0 | 50.0 |
| Alkyl phenol resin obtained by condensing para-octyl phenol with about 2 mols of formaldehyde in an alkaline medium | 3.0 | 3.0 | 3.0 |

[1] Non-staining cold polymerized synthetic elastomer having a styrene component between 20 and 25%.
[2] Unsaturation between 1.5 and 2.0 mol percent; non-staining; Mooney viscosity 75.

The vulcanization was carried out at 155° C. The chlorosulfonated polyethylene and the zinc oxide were used in such an amount that at most 1.4 parts of $ZnCl_2$ was formed, a part of the zinc oxide being unreacted.

PREPARATION OF THE MIXTURES

A rolled sheet of the butadiene-styrene copolymer, the butyl rubber and the chlorosulfonated polyethylene was prepared on a roller mill. The zinc oxide was incorporated into the sheet first and then the stearic acid and the carbon black. After the sheet has been removed from the roller mill the rolls were heated to about 190° C. and the mixture then rolled for 10 minutes and kept at a temperature between 195° and 205° C. The mixture was then allowed to cool down and the alkyl phenol resin was incorporated in the sheet on the cooled roller mill.

The sheets were then vulcanized under the conditions shown in Table II and were found to have the physical characteristics shown therein.

TABLE II

| Mixture | I | | II | | III | |
|---|---|---|---|---|---|---|
| Vulcanization temperature ° C. | 155 | | 155 | | 155 | |
| Vulcanization time (minutes) | 20 | 60 | 20 | 60 | 20 | 60 |
| Tensile strength (kg./cm.²) | 152 | 167 | 117 | 121 | 87 | 96 |
| Elongation at break (percent) | 300 | 250 | 207 | 173 | 197 | 182 |
| 150% modulus (kg./cm.²) | 52 | 78 | 79 | 98 | 75 | 86 |
| Hardness (Shore Durometer, A scale) | 63 | 67 | 68 | 71 | 71 | 74 |
| Rebound elasticity (percent) | 26 | 26 | 19 | 19 | 15 | 15 |

Though the above data do not show that the vulcanizates are homogeneous, homogeneity is shown by the fact that the vulcanizates do not delaminate but remain homogeneous after swelling for 36 hours in petroleum hydrocarbons. This shows that the butyl rubber is firmly linked to the butadiene-styrene copolymer.

*Example 2*

Homogeneous vulcanizates may also be obtained by vulcanizing butyl rubber and butadiene-styrene copolymers in the presence of sulfur.

TABLE III

| Mixture | IV |
|---|---|
| | Parts |
| Butadiene styrene copolymer (of Example 1) | 48.75 |
| Butyl rubber (of Example 1) | 48.75 |
| Chlorosulfonated polyethylene (29% Cl, 1.25% S) | 2.50 |
| Zinc oxide | 1.30 |
| Carbon black (high abrasion furnace) | 50.0 |
| Stearic acid | 1.50 |
| Sulfur | 1.63 |
| Dibenzothiazyldisulfide | 2.00 |
| Tetramethylthiuramdisulfide | 0.75 |

The vulcanization was carried out at 150° C. Up to 1.4 parts zinc chloride could be formed from the chlorosulfonated polyethylene and the zinc oxide. The mixture was prepared and hot treated as described in Example 1, for 10 minutes at 190° C. Sulfur and the accelerators were subsequently incorporated on cool rolls.

PHYSICAL CHARACTERISTICS

TABLE IV

| Vulcanization temperature ° C. | 150 | |
|---|---|---|
| Vulcanization time (minutes) | 20 | 60 |
| Tensile strength (kg./cm.²) | 82 | 85 |
| Elongation at break (percent) | 226 | 126 |
| Hardness (Shore Durometer, A scale) | 64 | 71 |
| Rebound elasticity (percent) | 18 | 19 |

It was found by swelling experiments on samples obtained from the 60 minute vulcanization that the vulcanization products were homogeneous. The products did not delaminate. Furthermore a comparison of mixtures II and IV shows that vulcanization products prepared using alkyl phenol resins are generally distinguished from those obtained using sulfur as vulcanizing agent by better properties.

If mixture IV is not hot rolled before the addition of the vulcanizing agent, but stored for 50 minutes at 200° C., the vulcanizates obtained have almost equal properties.

*Example 3*

Homogeneous vulcanizates may also be obtained by vulcanizing mixtures of butyl rubber and butadiene-styrene polymers in the presence of metal halides when no heat treatment is applied prior to vulcanization. In this case the metal halide acts more weakly on the elastomer mixture so that by a suitable selection of the metal halide and a suitable adjustment of the vulcanization time and, if desired, of the weight ratio of butyl rubber to the other elastomers, homogeneous and stable vulcanization products may be obtained.

TABLE V

| Mixture | V | VI |
|---|---|---|
| | Parts | Parts |
| Butyl rubber [1] | 75.0 | 50.0 |
| Butadiene styrene rubber (styrene component 23.5% by weight, otherwise see Example 1) | 25.0 | 50.0 |
| Carbon black ("Gasruss" a commercial product of German origin) | 50.0 | 50.0 |
| Stearic acid | 1.0 | 1.0 |
| Mineral oil | 2.0 | 2.0 |
| Alkyl phenol resin obtained by condensing para-isooctyl phenol with about 1.8 mols of formaldehyde in an alkaline medium | 9.0 | 9.0 |
| $SnCl_2 \cdot 2H_2O$ | 3.0 | 3.0 |

[1] Mooney viscosity between 41 and 49; non-staining; 2.1 to 2.5 mol percent unsaturation.

The mixtures were prepared in a conventional manner on cooled rolls. The vulcanization was carried out for 45 minutes at 154° C.

The vulcanizate had the physical properties shown in Table VI.

TABLE VI

| Mixture | V | VI |
|---|---|---|
| Tensile strength (kg./cm.²) | 62 | 90 |
| Elongation at break (percent) | 207 | 182 |
| 150% Modulus (kg./cm.²) | 52 | 72 |
| Hardness (Shore Durometer, A scale) | 70 | 70 |
| Rebound elasticity (percent) | 13 | 19 |

*Example 4*

This example illustrates the manufacture of homogeneous vulcanization products from mixtures of butyl rubber with either butadiene acrylonitrile copolymers or with 1,4-cis-polyisoprene.

TABLE VII

| Mixture | VII | VIII |
|---|---|---|
| | Parts | Parts |
| Butadiene acrylonitrile copolymer (non-staining cold polymerised rubber; acrylonitrile component between 25 and 50% by weight) | 49.0 | |
| 1,4-cis-polyisoprene | | 48.75 |
| Butyl rubber (Mooney viscosity 83; 1.5 to 2.0 mol percent unsaturation) | 49.0 | 48.75 |
| Chlorosulfonated polyethylene (29% Cl, 1.25% S) | 2.0 | 2.5 |
| Zinc oxide | 1.2 | 1.3 |
| High abrasion furnace carbon black | 45.0 | 50.0 |
| Stearic acid | 1.0 | 1.0 |
| Alkyl phenol resin obtained by condensing para-tertiary butyl phenol with about 1.7 mols of formaldehyde in an alkaline medium | 3.0 | 3.0 |

The mixtures shown in Table VII were prepared in the same manner as those of Example 1 except that mixture VIII was rolled at a temperature between 170° and 175° C.

The vulcanizates had the physical properties shown in Table VIII.

TABLE VIII

| Mixture | VII | VIII | | |
|---|---|---|---|---|
| Vulcanization temperature (° C.) | 155 | 155 | | |
| Vulcanization time (minutes) | 20 | 20 | 40 | 60 |
| Tensile strength (kg./cm.$^2$) | 110 | 92 | 96 | 90 |
| Elongation at break (percent) | 215 | 252 | 228 | 194 |
| 150% Modulus (kg./cm.$^2$) | 69 | 53 | 64 | 70 |
| Hardness (Shore Durometer, A scale) | 67 | 66 | 69 | 70 |
| Rebound elasticity (percent) | 12 | 20 | 20 | 21 |

Mixtures with almost the same properties were obtained by replacing the zinc oxide with an equal amount of zinc carbonate or with 5.0 parts of zinc stearate or with a mixture of 1.0 part of iron stearate and 0.2 part of zinc oxide. If metal stearates were used the amount of the free stearic acid would be reduced to 0.5 part.

Example 5

This example illustrates the manufacture of homogeneous vulcanizates according to a modification of the process according to the invention in which the heat treatment is carried out in the presence of a small amount of an alkyl phenol resin which per se acts as a vulcanizing agent.

TABLE IX

| Mixture | IX | X |
|---|---|---|
| | Parts | Parts |
| Butadiene acrylonitrile copolymer (cf. Example 4) | 48.75 | 48.75 |
| Butyl rubber (cf. Example 4) | 48.75 | 48.75 |
| Chlorosulfonated polyethylene (29% Cl, 1.25% S) | 2.5 | 2.5 |
| Zinc oxide | 1.3 | 1.3 |
| Carbon Black (high abrasion furnace) | 50.0 | 50.0 |
| Stearic acid | 1.0 | 1.0 |
| Alkyl phenol resin (of high vulcanization effectiveness obtained by condensing in an alkaline medium para-isooctyl phenol with formaldehyde in a molar ratio of about 1 to 2) | 0.5 | 1.0 |

The mixtures given in Table IX were mixed between rolls and then rolled between hot rolls for an additional 10 minutes. During this procedure the temperature of the mixtures was between 150° and 160° C. Then an additional 3 parts of the alkyl phenol resin vulcanizing agent were incorporated into each mixture on cooled rolls so that this contains a total of 3.5 to 4 parts by weight of alkyl phenol resin per 100 parts of the elastomer mixture.

The physical properties found for the vulcanizates are shown in Table X.

TABLE X

| Mixture | IX | | X | |
|---|---|---|---|---|
| Vulcanization temperature ° C. | 155 | | 155 | |
| Vulcanization time (minutes) | 40 | 60 | 40 | 60 |
| Tensile strength (kg./cm.$^2$) | 92 | 90 | 87 | 91 |
| Elongation at break (percent) | 162 | 149 | 152 | 148 |
| 150% Modulus (kg./cm.$^2$) | 84 | 90 | 87 | 93 |
| Hardness (Shore Durometer, A scale) | 72 | 74 | 74 | 74 |
| Rebound elasticity | 12 | 12 | 12 | 12 |

While I have illustrated the principle of the present invention with the aid of certain specific embodiments thereof, it will be apparent to those skilled in the art that the invention is not limited to these specific examples, and that various changes and modifications may be made without departing from the spirit of the invention or the scope of the appended claims.

The heavy metals referred to are those having a specific gravity of greater than 4.

What is claimed is:

1. A process for the vulcanization of mixtures of a rubbery copolymer of a major portion of an iso-olefin having from 4 to 7 carbon atoms and a minor portion of a poly-olefinic unsaturated hydrocarbon having from 4 to 14 carbon atoms and at least one other rubbery elastomer selected from the group consisting of natural rubber, homopolymers of butadiene and isoprene and copolymers of at least one diene selected from the group consisting of butadiene and isoprene with a monomer selected from the group consisting of acrylonitrile and styrene, which elastomer is vulcanizable by the action of sulfur which comprises admixing with the said elastomers a compound selected from the group consisting of (A) halides of metals of groups II and III of the periodic table in an amount of 0.1 to 10% by weight based on the weight of the mixture of elastomers, (B) halides of heavy metals other than those belonging to groups II and III of the periodic table in an amount of 0.1 to 10% by weight, based on the weight of the mixture of elastomers and (C) an organic halogen donor which under the reaction conditions splits off a molecule selected from the group consisting of halogen and hydrogen halide with a compound selected from the group consisting of oxides and salts of weak acids of said metals reactive with said halogen donor at a temperature in the range from 70 to 250° C. in amounts capable of forming 0.1 to 10% by weight of metal halide, based on the weight of the mixture of elastomers, heating the mixture to a temperature in the range from 70 to 250° C., adding a vulcanization agent selected from the group consisting of (1) sulfur and an accelerator and (2) a phenol aldehyde condensate vulcanizing agent and heating the mixture until vulcanization occurs to yield homogeneous vulcanization products.

2. The process of claim 1 wherein the mixture is heated to a temperature in the range from 120 to 220° C. prior to the addition of the vulcanization agent.

3. The process of claim 1 wherein the halogen component of said metal halides is chlorine.

4. The process of claim 1 wherein the said rubbery copolymer of the isoolefin and the polyolefinic unsaturated compound is present in the elastomer mixture in an amount between 20 and 80%.

5. A process as claimed in claim 1, in which the vulcanization is effected at the temperature in a range from 110 to 220° C.

6. A process as claimed in claim 1, wherein the vulcanization is carried out in the presence of a hydrocarbon substituted phenol aldehyde resin obtained by reacting in an alkaline medium a hydrocarbon substituted phenol in which the hydrocarbon radicals contain together from 1 to 12 carbon atoms with an aldehyde having 1 to 7 carbon atoms.

7. A process as claimed in claim 1, wherein the vulcanization is effected in the presence of a resin obtained by reaction of a binuclear diphenol with formaldehyde in an alkaline medium.

8. A process as claimed in claim 1, wherein the vulcanization is effected in the presence of sulfur and an accelerator.

9. The process of claim 1 wherein the percentage of said metal halide is from 0.3 to 8% by weight, based on the weight of the mixture of elastomers.

10. The process of claim 9 wherein the percentage of said metal halide is from 1 to 4% by weight, based on the weight of the mixture of elastomers.

11. A homogeneous vulcanization product obtained by the process of claim 1.

12. A homogeneous vulcanization product as claimed in claim 11, wherein the metal halide content is between 0.3 and 8% by weight.

13. A homogeneous vulcanization product as claimed in claim 11, wherein the metal halide content is between 1 and 4% by weight.

14. A shaped body consisting of the vulcanization product of claim 11.

15. A process for the vulcanization of mixtures of a rubbery copolymer of a major portion of an isoolefin having from 4 to 7 carbon atoms and a minor portion of a polyolefinic unsaturated hydrocarbon having from 4 to 14 carbon atoms and at least one other rubbery elastomer selected from the group consisting of natural rubber, homopolymers of butadiene and isoprene and copolymers of at least one diene selected from the group consisting of butadiene and isoprene with a monomer selected from the group consisting of acrylonitrile and styrene, which elastomer is vulcanizable by the action of sulfur which comprises admixing with the said elastomers an organic halogen donor which under the reaction conditions splits off a molecule selected from the group consisting of halogen and hydrogen halide and a compound selected from the group consisting of oxides and salts of weak acids of at least one metal selected from the group consisting of metals from groups II and III of the periodic table and of heavy metals other than those belonging to groups II and III of the periodic table which metal compound is reactive with said halogen donor at a temperature in the range between 120 and 220° C., in amounts capable of forming 0.3 to 8% by weight of metal halide, based on the weight of the mixture of elastomers, heating the mixture of elastomers containing the metal compound and the halogen donor to a temperature of 120 to 220° C., adding 1 to 20% by weight, based on the weight of the mixture of elastomers of a phenol aldehyde resin vulcanizing agent to the mixture and heating the mixture until vulcanization occurs to yield homogeneous vulcanization products.

References Cited by the Examiner
UNITED STATES PATENTS

| | | | |
|---|---|---|---|
| 3,007,889 | 11/1961 | Smith | 260—846 |
| 3,036,986 | 5/1962 | O'Connor et al. | 260—845 |
| 3,039,978 | 6/1962 | Fusco et al. | 260—846 |
| 3,056,754 | 10/1962 | Giller | 260—3 |
| 3,096,301 | 7/1963 | Jankowski et al. | 260—888 |

MURRAY TILLMAN, *Primary Examiner.*

LEON J. BERCOVITZ, SAMUEL BLECH, *Examiners.*

J. W. SANNER, G. F. LESMES, *Assistant Examiners.*